United States Patent [19]
Kitai et al.

[11] 3,842,429
[45] Oct. 15, 1974

[54] FOCAL PLANE SHUTTER BLADE ARRANGEMENT AND SUPPORT

[75] Inventors: Kiyoshi Kitai, Tokyo; Eiichi Onda, Saitama; Mitsuo Koyama, Chiba; Shinji Nagaoka, Chiba; Tadashi Nakagawa, Chiba, all of Japan

[73] Assignee: Seiko Koki Kabushiki Kaisha, Tokyo, Japan

[22] Filed: May 14, 1973

[21] Appl. No.: 359,875

[30] Foreign Application Priority Data
May 15, 1972 Japan.............................. 47-47830

[52] U.S. Cl................................ 354/250, 354/246
[51] Int. Cl. ........................................ G03b 9/10
[58] Field of Search ............ 95/53 R, 55, 58, 59, 60; 354/250, 245, 246, 249

[56] References Cited
UNITED STATES PATENTS
| | | | |
|---|---|---|---|
| 2,975,689 | 3/1961 | Chatani | 95/55 |
| 3,580,156 | 5/1971 | Loseries | 95/60 |
| 3,628,438 | 12/1971 | Loseries | 95/59 |

Primary Examiner—Samuel S. Matthews
Assistant Examiner—Russell E. Adams, Jr.
Attorney, Agent, or Firm—Robert E. Burns; Emmanuel J. Lobato; Bruce L. Adams

[57] ABSTRACT

A focal plane shutter arrangement in which a first group of shutter-opening blades and a second group of shutter-closing blades are actuated by respective pairs of operating levers. The shutter blades are principally supported for parallel movement by means other than the operating levers. Each group of shutter blades has a rectangular slit-forming shutter blade having a straight edge. This blade is moved in a parallel manner in which it is constantly maintained with its straight edge normal to a plane passing transversely of the shutter aperture. The shutter blades are guided in their movement by either arcuate or rectilinear slots and are actuated by a rod connected to the lever system. The shutter blades in each group are supported in independent support except for one which is supported from the slit-forming shutter blade of its respective group. The focal plane shutters is accordingly made compact and the inertia of the individual shutter blade groups is reduced or minimized.

5 Claims, 3 Drawing Figures

FOCAL PLANE SHUTTER BLADE ARRANGEMENT AND SUPPORT

BACKGROUND OF THE INVENTION

The present invention relates to focal plane shutters and more particularly to a shutter blade arrangement and support thereof for focal plane shutters.

The division of the shutter blades in focal plane shutters into separate groups for opening and closing the shutter are well known. Moreover moving the blades in parallel motion is better than pivoting them. The arranging of the blades into groups avoids the inertia that would result from having the blades arranged as a single group. However, if the support of the shutter blades is by the shutter levers which operate the blades this requires that the width of the blades and more particularly the slit-forming blades be made larger. Furthermore a complex linking mechanism and link structure becomes necessary increasing the size of the shutters and making it harder to maintain accurate parallel motion.

SUMMARY OF THE INVENTION

It is a principle object of the invention to provide a new and improved shutter blade support allowing the construction of a compact focal plane shutter.

Another object of the present invention is to provide a focal plane shutter blade arrangement in which a slit is progressively formed accurately and uniformly as the shutter aperture is opened and closed.

The focal plane shutter according to the invention comprises a first group of shutter-opening blades operable from an operative position closing the exposure aperture when the shutter is in a cocked condition to an operative position opening the exposure aperture for taking of a photograph. A second group of shutter-closing blades operable from an operative position spaced from the exposure aperture to an operative position, jointly closing the exposure aperture subsequent to taking of an exposure, is actuated separately from the first group. Each shutter blade group comprises a plurality of shutter blades and one in each group comprises a slit-forming blade having a straight edge actuated with the straight edge substantially normal to a plane passing transversely to the exposure aperture and transversely to the direction of movement of the slit-forming shutter blade.

A pair of actuating levers is provided for each group. Each pair comprises a pivotally driven main lever or link which actuates a second auxiliary lever connected thereto. The main lever is directly connected to the slit-forming blade and drives the slit-forming shutter blade. The main lever is provided with a rod that travels along a path guided by slits or slots in the shutter blades and actuates them sequentially or progressively. The slit-forming blade of each group is supported by the main operating lever. It then supports the next adjacent shutter blade while the third shutter blade is supported on the operating rod actuated by the main lever and the fourth shutter blade is supported on a pin mounted on a baseboard that has the exposure aperture, which is opened and closed by the blades. The auxiliary lever is pivoted at one end on a fixed rod that guides the travel of the third blade and its opposite end pivots on a fixed axis on the slit-forming blade so that it is actuated by the main operating lever when it actuates the slit-forming blade.

BRIEF DESCRIPTION OF THE DRAWINGS

Other objects and advantages of the focal plane shutter blade arrangement and support according to the invention will appear from the following description of an example of the invention, and the novel features will be particularly pointed out in the appended claims and following drawings in which:

DESCRIPTION OF THE PREFERRED EMBODIMENT

Figure 1:
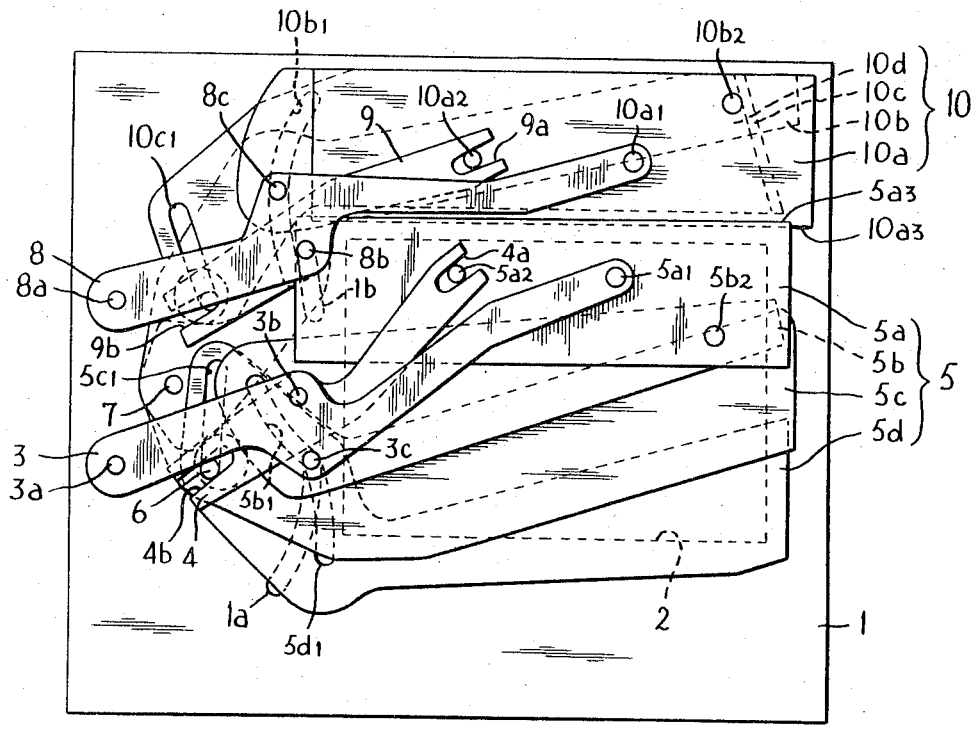
FIG. 1 is a front elevation view of a focal plane shutter blade arrangement and support according to the invention and illustrating the shutter in a cocked condition.

As shown in FIG. 1 a baseboard 1 has an exposure aperture 2 in a rectangular configuration. A shutter blade operating main lever 3 is mounted on a pivot 3a and drives an auxiliary lever 4. The pair of levers actuate shutter-opening blades 5a–5d. The shutter is shown in a cocked condition in FIG. 1 in which the shutter-opening blades close the shutter aperture 2 and open it whenever the pivot 3a is rotationally driven by the shutter-opening mechanism, not shown, of the camera in taking a photograph.

The shutter-opening blade group 5 has a slit-forming blade 5a which has a rectangular configuration and a second shutter blade 5b which has a generally triangle-shaped configuration with its base being wider than the remainder of the blade and has an arc-shaped slot $5b_1$ on the base thereof. A third shutter blade 5c provided has a curved base provided with a rectilinear guide slot $5c_1$ and a fourth shutter blade 5d likewise has a suitably curved base provided with a rectilinear guide slot $5d_1$ and a round hole $5d_2$ in its base. These blades are arranged in a superposed position and may be situated below the exposure opening 2.

Figure 2:
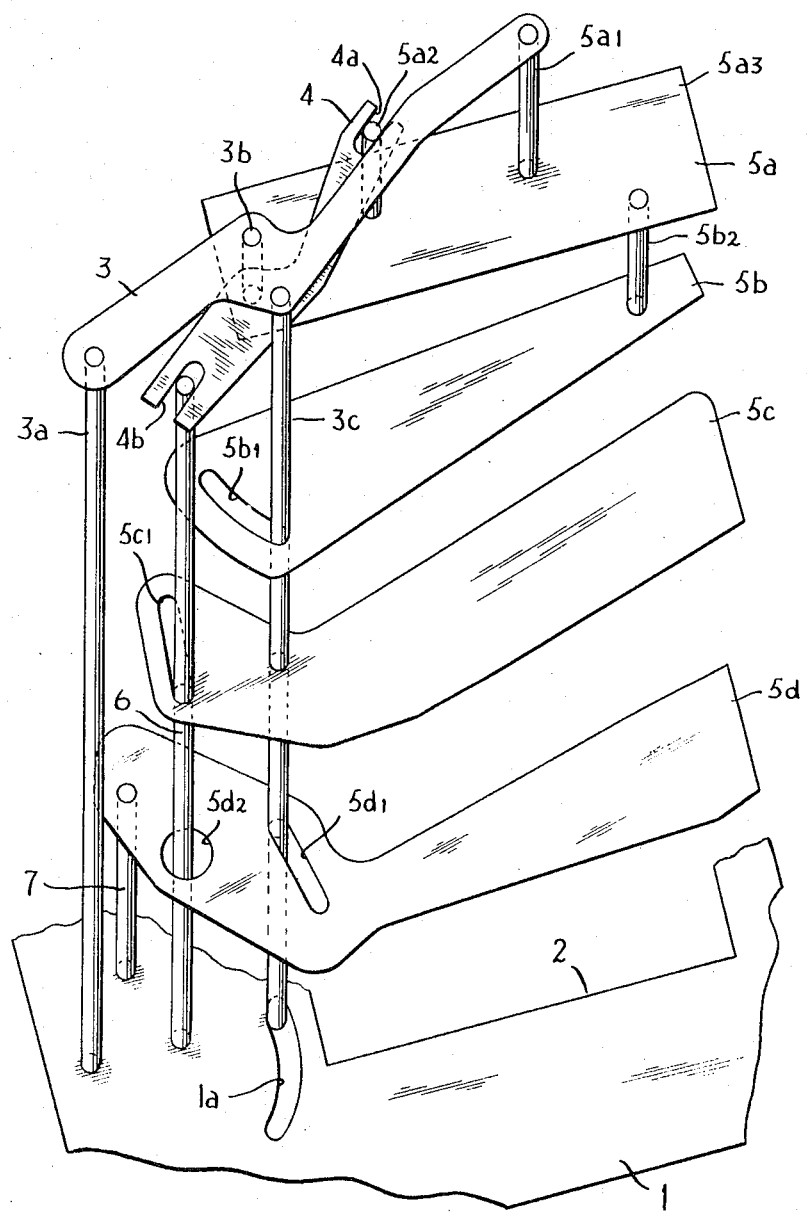
FIG. 2 is an exploded view, on an enlarged scale, of shutter-opening blades on the focal plane shutter in FIG. 1.

The supporting structure of the opening blade group 5 is as follows: A middle part of the auxiliary lever 4 is rotatably connected with the driving or actuating main lever 3 in a generally central portion thereof by means of a pin 3b. Both ends of the auxiliary lever are bifurcated by notches 4a, 4b as shown in FIG. 2. Support pin $5a_1$ and upstanding pin $5a_2$ are fixed on the slit-forming blade 5a in a plane parallel to a slit-forming edge $5a_3$ with a suitable space between each other and the free end of the driving lever 3 is rotatably connected with the support pin $5a_1$.

The end notch or slot 4a of the auxiliary lever 4 is engaged with the upstanding fixed pin $5a_2$ and is frictionally engaged therewith. The other end notch 4b of the auxiliary lever is engaged with a fixed long pin 6 secured to the baseboard 1 and pivots thereon. The fixed pin 6 extends axially through the rectilinear slot $5c_1$ and the round hole $5d_2$ of the third and fourth shutter blades 5c, 5d. The plane that passes through both pins $5a_1$, $5a_2$ is parallel to a plane that passes through the pivotal pin 3a and the fixed pin 6 whereby a parallel motion mechanism is formed with the two fixed pins 3a, 6 as a fixed section so that when the driving or actuating main lever 3 is rotationally driven the support and upstanding pins $5a_1$, $5a_2$ have parallel movement. That is, the slit-forming blade 5a will always move parallel to the plane defining the long boundary of the aperture and normal to a plane passing transversely of the shutter aperture and transverse to the direction of movement of the slit-forming blade. Accordingly, the slit-forming blade always forms a rectangular slit accurately as the shutter is being opened.

An operating pin 3c is fixed to the middle of part of the driving lever 3. This operating pin extends axially through the guide slot $5d_1$ of the second shutter blade 5b and through the base of the third shutter blade 5c supported thereon and extends axially through the guide slot $5d_1$ of the shutter blade 5d and into an arcuate guide slot 1a on the baseboard and is movable therein. The tip of the shutter blade underlying the slit-forming blade is pivotally connected by means of the support pin $5b_2$ to the slit-forming blade. The lowermost blade 5d, as shown in FIG. 2, has its base rotatably supported on a fixed support pin 7. The guide grooves $5b_1$, $5c_1$, $5d_1$ are so shaped, that when the driving lever 3 is driven the driving pin 3c makes the shutter blades pivot about the pin $5b_2$, pin 3c and the fixed pin 7.

A second shutter blade group consisting of shutter-closing blades is employed for closing the shutter after it has been opened and a photographic exposure has been taken. A second actuating main lever 8 pivoted by a pin 8a and a second operating auxiliary lever 9 actuate a shutter-closing group of blades 10. The actuating levers and shutter-closing blades are constructed similarly to the actuating levers and blades heretofore described but are made in opposite hand configurations or mirror image-like of the first set of levers and shutter blades described. Thus the shutter-closing blade group consists of a slit-forming shutter blade 10a, a second shutter blade 10b with a guide slot $10b_1$, a third shutter blade 10c with a guide slot $10c_1$, a fourth shutter blade 10d with a guide slot $10d_1$ and a hole $10d_3$ and situated above the exposure aperture in the drawing and actuatable in the same direction as the shutter-opening blade group 5 when closing.

The supporting structure for this group of blades consists of a driving lever 8 on its pivot 8a, the auxiliary lever 9 with the connecting pin 8b connecting the two levers pivotally, a driving pin 8c, supporting and upstanding pins $10a_1$, $10a_2$ of the shutter blades 10a, 10b. A guiding slot 1b for actuating the pin 8c set in the baseboard shares with the baseboard fixed pins a fixed position. The second auxiliary lever is bifurcated at both ends by slots 9a, 9b engaging the fixed pin 11 and upstanding pin $10a_2$ on the slit-forming blade 10a. Thus the arrangement has substantially the same construction. The slit-forming blade has a straight edge $10a_3$ which functions as a leading edge.

OPERATION

Figure 3:
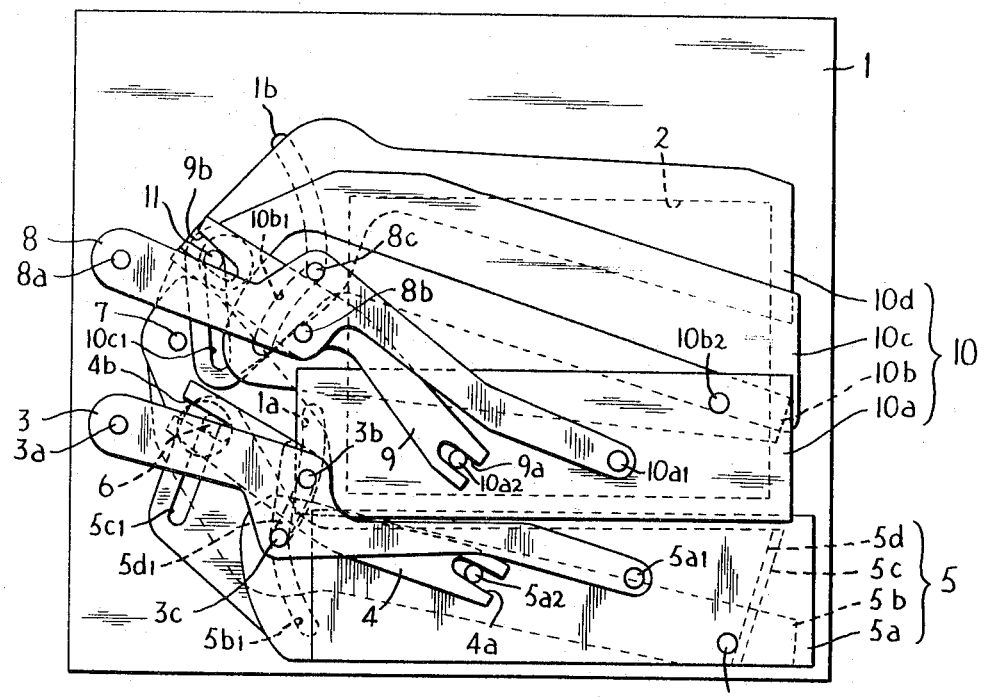
FIG. 3 is a front elevation view of the focal plane shutter in FIG. 1 illustrated in a closed condition after taking of a photographic exposure.

When the opening, driving or actuating device of the camera is actuated upon release of the release button of the camera, not shown, the driving main lever 3 is rotated from its cocked position in a clockwise direction and moves the slit-forming blade 5a by means of the support pin $5a_1$ on its free end or tip. Simultaneously, the auxiliary lever 4 rotates about the pin 3a and moves the blade 5a in parallel motion while it has its one bifurcated end guided by the fixed pin 6. It supports the supporting pin $5a_2$ of the slit-forming blade 5a by means of the other end, which is frictionally engaged therewith. The driving main lever 3 actuates its actuating pin 3c which moves the blades 5b–5d sequentially by movement along the guiding grooves $5b_1$, $5d_1$ and moves the blade 5c along the fixed pin 6 thereby progressively opening the exposure opening 2. When the shutter is fully opened the shutter blades are superpositioned over each other as illustrated in the drawings in FIG. 3.

Once the exposure time has expired the camera exposure control mechanism, not shown, imparts rotation to the closing main driving lever 8. The operation of the shutter-closing blades is substantially the same as the operation of the shutter-opening blade group and takes place in a same direction. In this instance the leading edge of the slit-forming blade 10a functions as a leading edge and in the other case of the shutter blade 5a it functions as a trailing edge. When the exposure is fully completed the shutter is closed.

Those skilled in the art will note that in the shutter support structure of the focal plane shutter according to the invention only the opening and closing driving main levers are supported on one side of the exposure opening and the auxiliary levers are connected with and supported by the respective main driving levers. The construction is simple and moreover the supporting parts are greatly simplified and the entire device can be made compact thereby reducing the inertia. Moreover, since the two supporting points of the driving lever and auxiliary lever of the slit-forming blade of each group are arranged in parallel to the slit-forming straight edge the width of the slit-forming blade can be made narrow so as to meet the minimum width requirement and at the same time it enables securing parallel motion more reliably. Thereby the apparatus can be made more compact and slit uniformity is further improved.

What we claim and desire to secure by Letters Patent is:

1. For use in a focal plane shutter, a shutter blade arrangement and support comprising; means defining an exposure aperture; a first group of shutter-opening shutter blades operable from an operative position closing the exposure aperture when the shutter is cocked to an operative position opening the exposure aperture for the taking of a photograph; a second group of shutter-closing shutter blades operable from an operative position spaced from the exposure aperture to an operative position jointly closing the exposure aperture subsequent to the opening of said exposure aperture; each group of shutter blades comprising a slit-forming shutter blade having a straight edge and actuated with said straight edge substantially normal to a plane transversely to the exposure aperture and transverse to the direction of movement of the slit-forming shutter blade and a plurality of other shutter blades; means mounting said first group of shutter blades; and means mounting said second group of shutter blades, each mounting means comprising a pair of actuating levers comprising a selectively driven operating main lever and an auxiliary lever, pivotal means pivotally connecting one end portion of the main and auxiliary levers to the slit-forming shutter blade on axes disposed in a line parallel to said straight edge, means pivotally connecting the auxiliary lever to the main lever intermediate the ends of both, means pivotally mounting the other end portions of both levers for pivotal movement about axes disposed in a line parallel to said straight edge and means mounting the remaining shutter blades in the group for sequential movement in response to the movement of said main lever.

2. For use in a focal plane shutter, a shutter blade arrangement and support according to claim 1, in which said auxiliary lever comprises bifurcated opposite ends, and wherein said means connecting a free end of said auxiliary lever to said slit-forming shutter blade comprises an upstanding pin on said slit-forming shutter blade frictionally coupled to one bifurcated end of said auxiliary lever.

3. For use in a focal plane shutter, a shutter blade arrangement and support according to claim 2, in which said means connecting a free end of said main lever to said slit-forming shutter blade comprises a pivotal pin in a same plane as said upstanding pin, means defining a fixed pivot coupled to the bifurcated end of said auxiliary lever opposite to the bifurcated end coupled to said upstanding pin, said pivotal means and said fixed pivot being disposed spaced from each other in a common plane, and said common plane being disposed parallel to said same plane, whereby said slit-forming shutter blade is movable in a plane normal to said same plane and said common plane.

4. For use in a focal plane shutter, a shutter blade and support according to claim 1, in which said means mounting the remaining shutter blades comprises means defining slots in said remaining shutter blades and a first rod driven by said main lever and extending through the slots.

5. For use in a focal plane shutter, a shutter blade arrangement and support according to claim 4, wherein some of the shutter blades in each group other than the slit-forming shutter blade have arcuate slots and the remainder of the shutter blades in the same group having a rectilinear slots.

* * * * *